United States Patent

[11] 3,579,123

[72] Inventor Hirotoshi Koga
Tokyo, Japan

[21] Appl. No. 851,991
[22] Filed Aug. 21, 1969
[45] Patented May 18, 1971
[73] Assignee Nippon Electric Company, Limited
Tokyo, Japan
[32] Priority Aug. 23, 1968
[33] Japan
[31] 43/59899

[54] DC RESTORER APPARATUS
9 Claims, 5 Drawing Figs.

[52] U.S. Cl. .......... 328/164, 178/7.3, 328/162, 328/175, 330/11, 330/149
[51] Int. Cl. .......... H04b 1/12
[50] Field of Search .......... 178/7.1 (DC), 7.3 (DC), 7.5 (DC); 328/162, 163, 164, 168, 175; 330/11, 30 (D), 149

[56] References Cited

UNITED STATES PATENTS

| | | | |
|---|---|---|---|
| 2,851,520 | 9/1958 | Polonsky et al. .......... | 330/11X |
| 3,287,575 | 11/1966 | Widl .......... | 328/164X |
| 3,304,508 | 2/1967 | Danielsen et al. .......... | 328/164 |
| 3,375,326 | 3/1968 | Baldwin et al. .......... | 330/11X |

*Primary Examiner*—Donald D. Forrer
*Assistant Examiner*—R. C. Woodbridge
*Attorney*—Marn and Jangarathis

ABSTRACT: DC restorer apparatus is provided in accordance with the teachings of the present invention for restoring the DC and low frequency components to a pulse train received in a facsimile or data transmission system. The DC restorer apparatus provided comprises adder means for summing first and second input signals applied thereto and for providing an output signal representative of the received pulse train with the DC and low frequency components restored thereto. The adder means is adapted to have the received pulse train applied to the first input thereof while the output of a feedback loop, which includes both bistable circuit means and low-pass filter means, is applied as the second input thereto. The bistable circuit means is adapted to be driven by the output produced by such adder means and the output of the bistable circuit means is applied through the low-pass filter means to the second input of said adder means. The filtered output of the bistable circuit means is thus added to the received pulse train whereby the DC and low frequency components thereof are restored.

*INVENTOR.*
Hirotoshi Koga
*BY*
*Marn & Jangarathis*
*ATTORNEYS*

INVENTOR.
Hirotoshi Koga
BY
Marn & Jangarathis
ATTORNEYS

DC RESTORER APPARATUS

This invention relates to DC restorer apparatus and more particularly to DC restorer apparatus adapted for use in facsimile or data transmission systems.

In the television arts, the use of various forms of clamping circuits to restore the DC component of the video signal, after the AC amplification thereof, is well known so that the resulting DC voltage may serve as a bias voltage for the grid of the picture tube whereby the average reproduced brightness may be made to correspond to the average brightness of the scene being transmitted. Such clamping circuits may thereby appropriately serve as the DC restorer apparatus in television receivers because only pulses whose duration and waveform spacing are constant are acted upon. However, in facsimile or data transmission systems, the pulses acted upon in the receiver portions thereof are not characteristically constant in duration and/or waveform spacing and thus conventional restoration techniques, well known in the television arts, may not be extended thereto. Thus, as the pulses received in facsimile or data transmission systems are inherently characterized by duration and waveform spacing which are indefinite in nature, the clamping principles relied upon in television receivers are not applicable for use in the receiver portions thereof.

In data or facsimile transmission systems, it has been common practice to remove the DC components present in the signal to be transmitted and attenuate the low frequency components thereof by passing such signal to be transmitted through a high pass filter, prior to the transmission of such signal. Thereafter, the signal to be transmission of having the DC components removed and the low frequency components suppressed, may be transmitted to the receiving portion of such transmission system where such DC and low frequency components are restored by DC restorer apparatus present therein so that a pulse train corresponding to the signal initially sought to be transmitted is received and may be further utilized. The DC restorer apparatus present in the receiving portion of such transmission systems conventionally takes the form of an amplitude limiter circuit which employs positive feedback and includes a low-pass filter within the feedback loop formed. Thus, in this manner, a pulse train having a waveform which corresponds to the signal to be transmitted may be made available at the output of the receiver portion of such facsimile or data transmission system and the pulses present in this waveform manifest the same spacings and durations as those initially present in the signal to be transmitted. However, several disadvantages attach to the use of the foregoing forms of DC restorer apparatus in facsimile or data transmission systems, and these disadvantages often substantially impair the operation of the transmission system involved and the accuracy of the waveform transmitted thereby. For instance, the regenerative feedback relied upon in such conventional DC restorer apparatus will often cause the stability of the circuit to deteriorate and more particularly will cause changes in bias voltage derived therefrom to be enhanced, even if the bias voltage is maintained at a relatively low level, so that noise components as well as signal components will be fed back with a resulting reduction in the allowable noise margin. Furthermore, if the high pass filter initially relied upon to suppress the low frequency components of the signal to be transmitted exhibits a small time constant, the subsequent regeneration of such low frequency components becomes exceptionally difficult to accomplish because the trailing edges of pulses applied to a high pass filter having a small time constant are sharply decreased and hence, after transmission, will often fall short of the threshold level of the amplitude limiter circuit present in the conventional DC restorer apparatus. Additionally, a waveform comprising a plurality of rectangular pulses of varying amplitudes may not be suitably regenerated by such conventional DC restorer apparatus because the amplitude limiter circuit therein will act to limit the magnitude of each pulse therein and hence when large pulses, such as synchronizing pulses, are transmitted along with a pulse train of regular pulses whose amplitudes are smaller, the limiter circuit will render it impossible to separate such larger pulses at the receiver portion of the transmission system. Thus, it will be appreciated that conventional DC restorer apparatus presently utilized in conjunction with facsimile or data transmission systems relies on positive feedback techniques and that such reliance is a principal cause of the poor stability, the restricted noise margins, the difficulty in the regeneration of rectangular pulses in the low frequency regions and the inability to regenerate rectangular pulses of varying amplitudes exhibited thereby.

Therefore, it is an object of this invention to provide DC restorer apparatus for use in conjunction with facsimile or data transmission systems.

An additional object of this invention is to provide DC restorer apparatus wherein the form of feedback relied upon will not impair stability.

A further object of this invention is to provide DC restorer apparatus exhibiting substantial isolation from the effects of noise.

Another object of the present invention is to provide DC restorer apparatus which is fully operative upon receipt of an input pulse train comprising pulses of varying amplitudes.

Other objects and advantages of this invention will become clear from the following detailed description of an exemplary embodiment thereof, and the novel features will be particularly pointed out in conjunction with the appended claims.

In accordance with this invention, DC restorer apparatus is provided wherein a feedback loop for adder means therein includes both bistable circuit means and low-pass filter means, the bistable circuit means is adapted to be driven by the output produced by said adder means and the output of said bistable circuit means is applied through said low-pass filter means to an input of said adder means whereby the filtered output of said bistable circuit means is added to input signals applied to said adder means and the DC and low frequency components of said input signals may be restored. The invention will be more clearly understood by reference to the following detailed description of an exemplary embodiment thereof in conjunction with the accompanying drawings in which:

Figure 2:
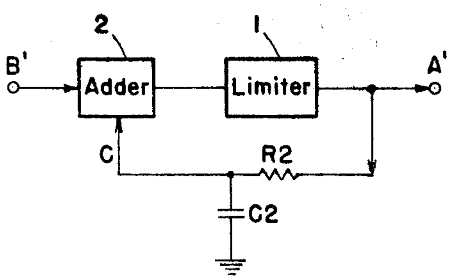
FIG. 2 shows conventional DC restorer apparatus.
Figure 3:
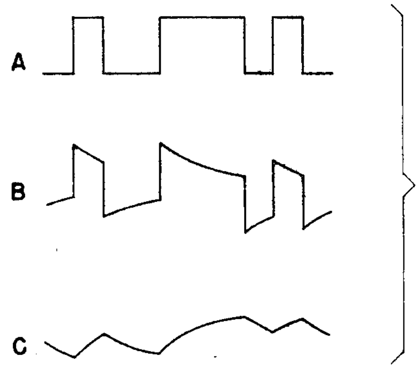
Figure 4:
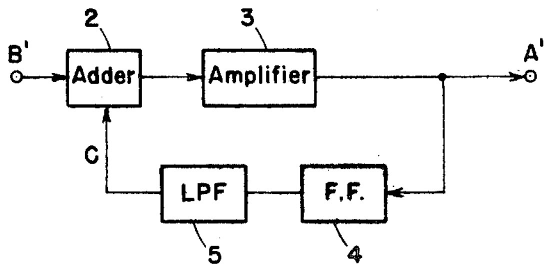
Figure 5:
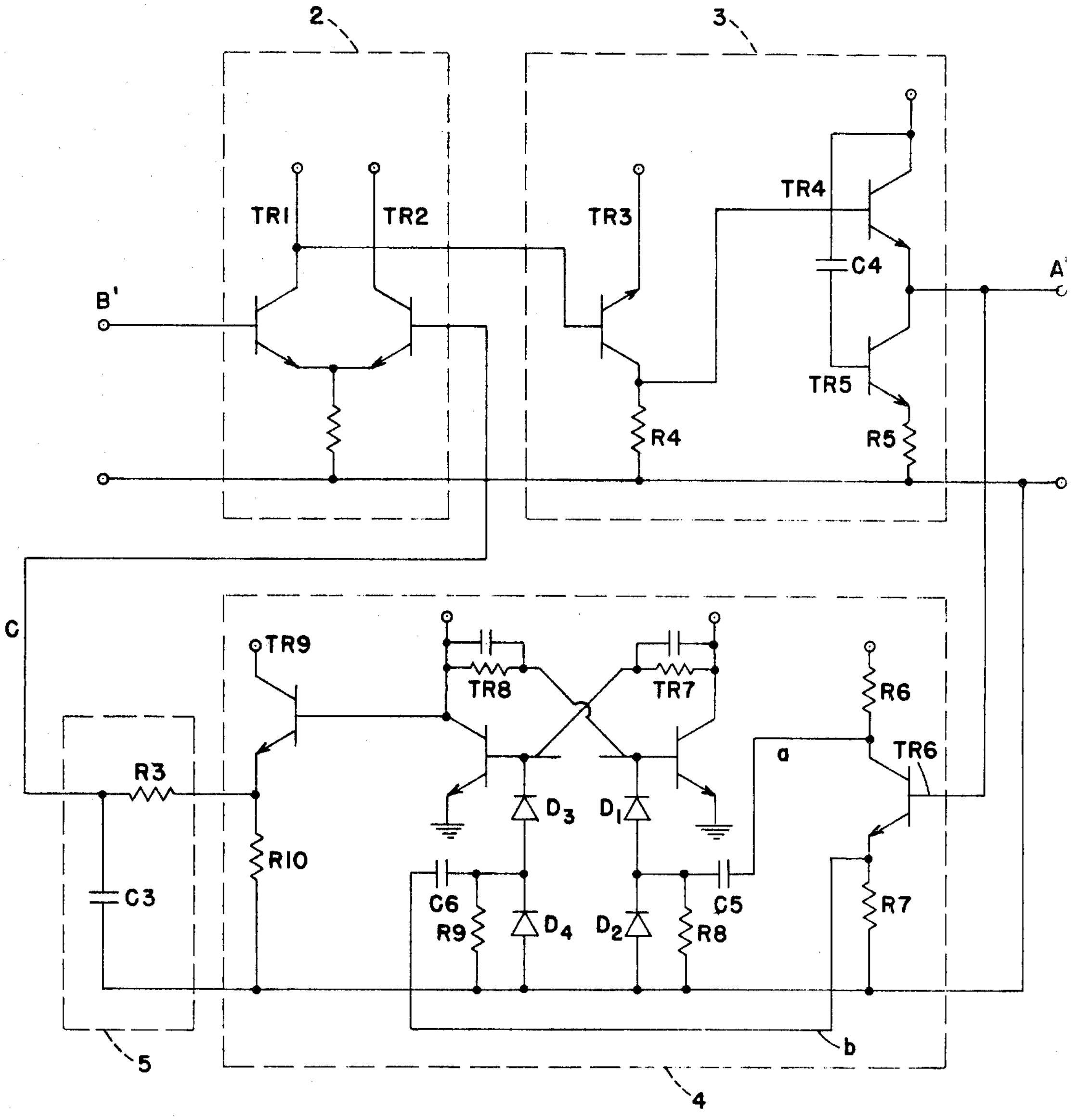

FIG. 3A—3C depict representative waveforms at different locations in the conventional DC restorer apparatus shown in FIG. 2 and in the embodiment of this invention shown in FIG. 4;

FIG. 4 is a block diagram of an exemplary embodiment of the DC restorer apparatus according to the present invention; and FIG. 5 is a circuit diagram which schematically illustrates one form of the exemplary embodiment of the DC restorer apparatus shown in FIG. 4.

Referring now to the drawings and more particularly to FIGS. 1, 2 and 3A—3C thereof, the conventional DC restorer apparatus shown in FIG. 2 will be briefly explained. If a conventional facsimile or data transmission system is considered, it will be appreciated that signals to be transmitted are initially applied to high pass filter means so that the DC components therein are removed and the low frequency components thereof are suppressed prior to the transmission thereof. The high pass filter means relied upon may take the form of the simple RC circuit illustrated in FIG. 1 which comprises input terminal means A, capacitor means $C_1$, resistor means $R_1$, and an output indicated at B. This simplified high pass filter means acts, when connected as in FIG. 1, in the well-known manner to pass frequency components present in an input signal applied thereto exceeding the cutoff frequency thereof while frequency components residing below such cutoff frequency will be substantially attenuated. Furthermore, any DC components present in the input signal applied to the high pass filter means illustrated in FIG. 1 will be blocked by the capacitor means $C_1$. Thus, if an input signal having the waveform illustrated in FIG. 3A is applied to the input terminal means A of the high pass filter means shown in FIG. 1, an output signal having the waveform illustrated in FIG. 3B will be produced at the output thereof, indicated at B, and the amount that the trailing edge of each pulse in said output signal is decreased when compared to the magnitude of the leading edge of that pulse will be a function of the time constant of the high pass filter means. The output signal derived from the high pass filter means shown in FIG. 1 may then be transmitted in the usual manner to the receiver portion of the facsimile or data transmission system under consideration.

Figure 1:
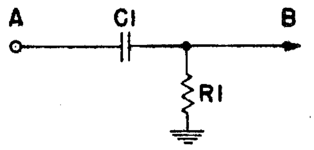
FIG. 1 illustrates high pass filter means of the type conventionally used to remove the DC components and suppress the low frequency components of signals to be transmitted in a facsimile or data transmission system.

If the receiver portion of the facsimile or data transmission system is now considered, it will be appreciated that the transmitted output signal of the high pass filter means shown in FIG. 1 will be received in the well-known manner and applied to the conventional DC restorer apparatus present therein. The conventional DC restorer apparatus may take the form illustrated in FIG. 2 which comprises input terminal means B′, output terminal means A′, amplitude limiter means 1, adder means 2 and the low-pass filter means formed by the capacitor $C_2$ and the resistor means $R_2$. The input terminal means B′ is adapted to receive the input signal to undergo DC restoration which here takes the waveform shown in FIG. 3B, as aforesaid. The input terminal means B′ is connected to a first input of the adder means 2. The adder means 2 may take the form of any conventional circuit means which acts to perform a summation operation upon the signals applied to the first and second inputs thereof and thereby produce an output signal representative of the sum of such input signals. The second input to the adder means 2 is connected to the conductor C while the output thereof is applied to the amplitude limiter means 1. The amplitude limiter means 1 may take any conventional form of this common class of device which acts in the well-known manner to limit the amplitude of its output signal to some predetermined threshold level despite the magnitude of the input signals applied thereto. The output of the amplitude limiter means 1 is connected, as shown in FIG. 2, to the output terminal means A′ of the illustrated DC restorer apparatus and in addition is applied to the low-pass filter means formed by the resistor means $R_2$ and the capacitor means $C_2$. The low-pass filter means formed by the resistor means $R_2$ and the capacitor means $C_2$ is entirely conventional and acts in the well-known manner to pass signal components applied thereto which reside below the cutoff frequency thereof and to substantially attenuate signal components residing at frequencies in excess of said cutoff frequency. The values of the resistor means $R_2$ and the capacitor means $C_2$ are selected so that the time constant of the low-pass filter means formed thereby will be approximately equal to the time constant of the high pass filter means illustrated in FIG. 1. The output of the low-pass filter means is coupled through the conductor C to the second input of the adder means 2. Thus, a regenerative feedback loop is established between the output of the amplitude limiter means 1 and the adder means 2 through the low-pass filter means formed by the capacitor means $C_2$ and the resistor means $R_2$.

In the operation of the conventional DC restorer apparatus illustrated in FIG. 2, an input signal whose waveform is illustrated in FIG. 3B is received at the input terminal means B′ and applied therefrom to the first input of the adder means 2. Additionally, the adder means 2 receives at the second input thereto, in a manner which is set forth below, a second input signal, whose waveform is illustrated in FIG. 3C, representative of the DC and low frequency components of the input signal to be restored. The adder means 2 acts in the well-known manner to combine the input signals received at the first and second inputs thereto and produce therefrom a B +C resultant output signal representative of the sum of the signals applied to such first and second inputs. The output of the adder means 2 is applied to the input of the amplitude limiter means 1 whereat the output of the adder means 2 is peak limited to a predetermined threshold value. The output of the amplitude limiter means 1 is applied to the output terminal means A′ to which suitable utilization circuitry, not shown herein, may be connected and to the input of the low-pass filter means formed by the capacitor means $C_2$ and the resistor means $R_2$. As the values of the capacitor means $C_2$ and the resistor means $R_2$ have been selected so that the low-pass filter means formed thereby will exhibit the same time constant as the high pass filter means shown in FIG. 1, the low-pass filter means will pass both the DC component and the low frequency components associated with the amplitude limited rectangular pulse train supplied thereto while the high frequency components thereof are attenuated. Furthermore, the resultant waveform of the DC component and the low frequency component produced by the low-pass filter means formed by the capacitor means $C_2$ and the resistor means $R_2$, as shown by the waveform illustrated in FIG. 3C, will comprise pulses whose waveform spacing and duration are precisely the same as the input signal applied to the input terminal means B′, as illustrated by the waveform shown in FIG. 3B. Therefore, as the output of the low-pass filter means is applied to the second input of the adder means 2, as aforesaid, the B +C output pulse train produced thereby will be equal to the original signal A sought to be transmitted, if it is assumed that the circuitry responsible for the derivation of the B and C signal components in the receiver means have been suitably adjusted so that the amplitudes of the B and C signals produced are appropriate for the summation thereof into the pulse train A shown in FIG. 3A. Accordingly, it will be seen that the conventional DC restorer apparatus shown in FIG. 2 acts upon the received input signal B shown in FIG. 3 to regenerate therefrom the original input signal A to be transmitted, as shown in FIG. 3A; however, such conventional DC restorer apparatus will manifest poor stability, restricted noise margins, difficulty in the regeneration of rectangular pulses in a low frequency range and an inability to regenerate rectangular pulses of varying amplitudes because positive feedback techniques are relied up therein.

Referring now to FIG. 4, there is shown a block diagram of an exemplary embodiment of the DC restorer apparatus according to the present invention. The embodiment of the DC restorer apparatus according to the present invention comprises input terminal means B′, output terminal means A′ adder means 2, amplifier means 3, flip-flop circuit means 4 and low-pass filter means 5. In FIG. 4, the input terminal means B′, the output terminal means A′ and the adder means 2 may each be considered to take the same form and perform the same function as the corresponding means previously described in conjunction with the conventional DC restorer means illustrated in FIG. 2. Accordingly, in FIG. 4, such corresponding means have retained previously adopted reference characters and the description thereof which appears hereinafter will be made by direct reference to the functions and forms of their FIG. 2 counterparts so that undue repetition is avoided. The input terminal means B′ is connected to a first input of the adder means 2 in the same manner as was described above in conjunction with FIG. 2. The adder means 2 may take any conventional form of circuit means which acts in the well-known manner to perform a summation operation upon a plurality of input signals applied to separate inputs thereof and produce in response thereto an output waveform representative of the sum of such signals. A second input to the adder means is connected to the conductor C and the output thereof is connected to the input of the amplifier means 3. The amplifier means 3 may take any well-known form of this common class of devices which acts in the conventional manner to apply an appropriate gain to input signals received thereby. Although the amplifier means 3 has been illustrated in FIG. 4, it will be obvious to those of ordinary skill in the art that, should the magnitude of the input signals applied to the input terminal means B′ sufficiently high or should the adder means exhibit appropriate gain, the amplifier means 3 may be omitted. The output of the amplifier means 3 is connected to the output terminal means A′ where the same may be further applied to utilization devices connected thereto and, in addition, is connected to the input or inputs of the flip-flop circuit means 4. The flip-flop circuit means 4 may take any conventional form of this well-known class of bistable devices and is adapted to produce an output pulse for each input pulse received thereby at a rate determined by such received input pulses. An output of the flip-flop circuit means 4 is connected to the low-pass filter means 5 as an input thereto. The low-pass filter means may take any conventional form of this type of device which acts in the well-known manner to pass any frequency components of an input signal applied thereto which reside below the cutoff frequency thereof while all such frequency components residing above said cutoff frequency are substantially attenuated. For example, the low-pass filter means 5 may take the form of the RC circuit illustrated in FIG. 2 or any other convenient circuitry may be used. The output of the low-pass filter means 5 is connected to the second input of the adder means 2 through the conductor C and hence a feedback loop, including the flip-flop circuit means 4 and the low-pass filter means 5, is established between the output of the amplifier means 3 and the second input to the adder means 2.

The operation of the embodiment of the DC restorer apparatus according to this invention will now be briefly considered in connection with the block diagram illustrated in FIG. 4; however, a more detailed description thereof will be set forth below in conjunction with an acceptable circuit diagram therefor, as illustrated in FIG. 5. As the exemplary embodiment of the DC restorer apparatus shown in FIG. 4 will be utilized in the receiver portions of conventional facsimile or data transmission systems, an input signal will be received at the input terminal means B′ thereof in the form of a pulse train having a waveform similar to that illustrated in FIG. 3B. Thus, the waveform applied to the input terminal means B′ will be representative of the pulse train whose waveform is shown in FIG. 3A after the DC components thereof have been removed and the low frequency components suppressed by high pass filter means similar to that shown in FIG. 1. The input signal thus received at the input terminal means B′ is applied to the first input of the adder means 2 and combined thereat with the input signals applied to the second input of the adder means 2 through the conductor C. In response to the applications of B signals to the first input of said adder means 2 and C signals to the second input thereof, said adder means will produce a B +C output signal representative of the summation of the values of the input signals received at such first and second inputs. The output of the adder means 2 is applied to the amplifier means 3 which acts in the well-known manner to amplify the output of the adder means 2 to an appropriate value. Thereafter, the output of the adder means 2 is applied through said amplifier means 3 to the output terminal means A′ and to the input of the flip-flop circuit means 4. As was previously stated, the flip-flop circuit means 4 will produce an output pulse for each pulse received thereby at a rate determined by such received input pulses. For instance, the flip-flop circuit means 4 may be adapted to be driven between the first and second binary states thereof by the leading and trailing edges of each of the pulses applied thereto so that it is switched from a first to a second state by the leading edge of each pulse received and switched from a second to first state by the trailing edge of each pulse received. Thus, under these conditions, the flip-flop circuit means 4 will produce an output signal characterized by rectangular pulses having the same duration and waveform spacing as the pulse train applied thereto. Furthermore, the output of the flip-flop circuit means 4 will not contain noise which may be present in the output of the adder means 2 or the amplifier means 3 since said flip-flop circuit means 4 here acts as an isolated pulse generator which is merely controlled by the input pulses applied thereto. The output of the flip-flop circuit means 4 is applied to the input of the low-pass filter means 5. The low-pass filter means 5 acts in the previously described manner to pass all frequency components of the output of the flip-flop circuit means 4 which reside below the predetermined cutoff frequency thereof, while all such components which exceed said cutoff frequency are substantially attenuated. Consequently, the DC level associated with the output of the flip-flop circuit means 4 is passed by said low-pass filter means 5 as are the low frequency components thereof, i.e., the fundamental and low order harmonics, while the high frequency components associated therewith are attenuated. Accordingly, the output of the low-pass filter means 5 will comprise a pulse train C whose waveform is similar to that illustrated in FIG. 3C. The output of the low-pass filter means 5 is applied through the conductor C to the second input of the adder means C. The adder means 2 thus receives first input signal B representative of the input signal A, as shown in FIG. 3A, initially sought to be transmitted with the DC and low frequency components removed and suppressed, respectively, and a second input signal C representative of the DC and low frequency components of a rectangular pulse train corresponding to the pulse train A shown in FIG. 3A. Accordingly, the B +C output of the adder means 2, and after amplification, the output of the DC restorer apparatus according to the present invention, is representative of the original signal sought to be transmitted as indicated by the waveform illustrated in FIG. 3A. Furthermore, as the flip-flop circuit means 4 is present in the feedback loop, the stability of the DC restorer apparatus as a whole is not impaired since said flip-flop circuit means 4 acts as a buffer circuit inserted into a positive feedback loop. In addition, as said flip-flop circuit means 4 acts as an externally controlled but isolated pulse generator, noise present in the output of the adder means 2 and/or the amplifier means 3 will not be fed back whereby noise isolation is improved. Additionally, the use of the flip-flop circuit means 4 is advantageous because as the output of the flip-flop circuit means 4 is applied to the low-pass filter means 5, rectangular pulses whose frequencies are substantially higher than the cutoff frequency of the low-pass filter means 5 may be acted upon by the DC restorer apparatus of the present invention without being affected by the flip-flop circuit means 4. Also, as no limiter circuit means is relied upon, the DC restorer apparatus according to the present invention is fully operative even when the input pulse train is composed of pulses of varying magnitudes. Therefore, it will be appreciated that the DC restorer apparatus according to the present invention is highly stable, exhibits substantial isolation from the effects of noise and is fully operative upon receipt of an input pulse train comprising pulses of varying amplitudes.

FIG. 5 is a circuit diagram which schematically illustrates one form which the exemplary embodiment of the DC restorer apparatus shown in FIG. 4 may take. In FIG. 5, each of the portions of the DC restorer apparatus shown in block form in FIG. 4 has been identified by an appropriately referenced dashed block so that the continuity between FIGS. 4 and 5 may be maintained. Accordingly, it will be seen that the DC restorer apparatus illustrated in FIG. 5, like its FIG. 4 counter part, comprises input terminal means B′ output terminal means A′, adder means 2, amplifier means 3, flip-flop circuit means 4 and low-pass filter means 5. The adder means 2 illustrated in FIG. 5 comprises first and second transistor means $TR_1$ and $TR_2$ connected in a differential amplifier configuration. A first input to the adder means 2 is connected between the input terminal means B′ for the illustrated DC restorer apparatus and the base electrode of the first transistor means $TR_1$ while a second input to the adder means 2 is connected through the conductor C to the base electrode of the second transistor means $TR_2$. The first and second transistors $TR_1$ and $TR_2$ are connected to suitable biasing means at the collector electrodes thereof, as indicated by the illustrated terminals connected thereto, and the emitter electrodes of said first and second transistor means $TR_1$ and $TR_2$ are commonly connected to thereby form this well-known differential amplifier circuit. The output of the adder means 2 shown in FIG. 5 is taken from the collector electrode of the first transistor means $TR_1$ and connected to the input of the amplifier means 3 at the base electrode of the transistor means $TR_3$ present therein. As will be apparent to those of ordinary skill in the art, an output taken from the collector electrode of the first transistor means $TR_1$ of the differential amplifying circuit formed by the first and second transistor means $TR_1$ and $TR_2$ will normally be equal to the difference between the input signals applied thereto, B—C; however, as shall be seen below, since the input signal applied to second input of the adder means 2 at the base of the second transistor means $TR_2$ is inverted by 180° the differential amplifying configuration formed by the transistors $TR_1$ and $TR_2$ performs the function of a summing circuit. The amplifier means indicated by the dashed block 3 comprises a two-stage transistor amplifier configuration wherein the first stage thereof includes the single transistor means $TR_3$ and the second stage thereof includes the transistor means $TR_4$ and $TR_5$ connected as a power output stage. The transistors means $TR_3$—TR are each illustrated as NPN devices as are each of the other transistor means shown in FIG. 5; however, as is well known to those of ordinary skill in the art, PNP transistors or any of the other well-known forms of transistor devices may be readily utilized. The base of the transistor means $TR_3$ is connected to the of transistor devices may be readily utilized. The base of the transistor means $TR_3$ is connected to the output of the adder means 2, as aforesaid, while the emitter electrode thereof is connected suitable biasing means as indicated by the terminal means illustrated. The collector electrode of transistor means $TR_3$ is connected through the resistor means $R_4$ to the circuit reference potential and to the base electrode of the transistor means $TR_4$. Accordingly, the transistor means $TR_3$ acts in the well-known manner to suitably amplify the output of the adder means 2 and apply such suitably amplified output to the input of the second stage of the amplifier means 3. The transistor means $TR_4$ and $TR_5$ form the second stage of the amplifier means 3 and are connected in a conventional power amplifying configuration wherein the collector of the transistor means $TR_4$ is connected to an appropriate biasing arrangement as indicated by the terminal means and to the base electrode of the transistor $TR_5$ through the coupling capacitor means $C_4$. The emitter electrode of the transistor means $TR_4$ is junctioned to both the output terminal means A' of the illustrated DC restorer apparatus and the collector electrode of the transistor means $TR_5$. Further, the series connection of the collector-emitter paths of the transistors $TR_4$ and $TR_5$ is completed by the connection of the emitter electrode of transistor $TR_5$ to the circuit reference potential through the resistor $R_5$.

In addition to being connected to the output terminal means A', the output of the adder means 2 is applied to the input of the flip-flop circuit means indicated by the dashed block 4 and more particularly to the base electrode of transistor means $TR_6$ present therein. The flip-flop circuit means 4 may be here considered to include three individual portions comprising a polarity discriminator formed by the transistor means $TR_6$, the multivibrator circuit per se formed by the transistor means $TR_7$ and $TR_8$ and an emitter-follower circuit formed by the transistor means $TR_9$. The transistor means $TR_6$ is connected in a well-known form of polarity discriminator or inverter circuit wherein a first output is derived from the collector electrode thereof whose polarity is inversely related to the polarity of the input applied to the base electrode thereof and a second output is derived from the emitter electrode thereof whose polarity is representative of the polarity of the input applied to the base electrode thereof. Accordingly, the collector electrode of the transistor means $TR_6$ is connected through the resistor means $R_6$ to an appropriate biasing means indicated by the terminal illustrated and to a first input of the multivibrator circuit means formed by the transistors $TR_7$ and $TR_8$ through the conductor *a*. Similarly, the emitter electrode of the transistor means $TR_6$ is connected through the resistor means $R_7$ to the circuit reference potential and to a second input of the flip-flop circuit means 4 formed by the transistors $TR_7$ and $TR_8$ through the conductor *b*. Therefore, it will be seen that when a rectangular waveform is applied from the amplifier means 3 to the base electrode of the transistor means $TR_6$, the transistor means $TR_6$ will alternately apply positive pulses to the conductors *b* and *a* in response to the leading and lagging edges of such rectangular pulses. The transistor means $TR_7$ and $TR_8$ are interconnected in the well-known form of a bistable multivibrator configuration wherein the emitter and collector electrodes thereof are cross-coupled in the conventional manner through the parallel RC combinations illustrated so that, due to the feedback arrangement therebetween, each transistor means is held in an original state by the condition of the other transistor means. In addition, the collector electrodes of each of the transistor means $TR_7$ and $TR_8$ are connected to suitable biasing means, not shown, at the terminal means indicated while the emitter electrodes thereof may be grounded as shown. The bistable multivibrator means formed by the transistor means $TR_7$ and $TR_8$ is arranged to be driven by two separate inputs applied thereto in an alternating manner. Thus, the base electrode of the transistor means $TR_7$ 6 connected to the first output of the transistor means $TR_6$ through the diode means $D_1$, the capacitor means $C_5$ and the conductor *a*, while the diode means $D_2$ and the resistor means $R_8$ are connected in parallel between the circuit reference potential and the series connection between said diode means $D_1$ and said capacitor means $C_5$. The RC circuit formed by the capacitor means $C_5$ and the resistor means $R_8$ acts in the well-known manner as a differentiator circuit to thereby differentiate the pulses present on conductor *a* and thus ensure that sharply defined trigger pulses are applied to the base electrode of the transistor means $TR_7$. The diode pair formed by the diode means $D_1$ and $D_2$ acts in the conventional manner to ensure that the pulses applied to the base of the transistor means $TR_7$ are of the requisite polarity, in this case positive, while pulses of opposite polarity, negative, which may be present on conductor *a* are applied to the circuit reference potential through the diode means $D_2$. In a similar manner, the base electrode of the transistor means $TR_8$ is connected to the second output of the transistor means $TR_6$ through the diode means $D_3$, the capacitor means $C_6$ and the conductor *b*, while the diode means $D_4$ and the resistor means $R_9$ are connected in parallel between the circuit reference potential and the series connection between said diode means $D_3$ and the capacitor means $C_6$. The RC circuit formed by the capacitor means $C_6$ and the resistor means $R_9$ here too acts as a differentiator circuit to ensure that only sharply defined trigger pulses are applied to the base electrode of the transistor means $TR_8$ while the diode pair formed by diodes $D_3$ and $D_4$ couple positive polarity pulses to the base electrode of the transistor means $TR_8$ and negative pulse through the diode means $D_4$ to the circuit reference potential. The output of the bistable multivibrator formed by the transistor means $TR_7$ and $TR_8$ is taken from the collector of the transistor means $TR_8$ and is applied to the base electrode of the transistor means $TR_9$ through the illustrated conductor therebetween. The transistor means $TR_9$ is connected in an emitter-follower or common collector configuration and thus serves in an impedance matching role as the output stage of the flip-flop circuit means. The transistor means $TR_9$ is connected at the collector electrode thereof to appropriate biasing means, not shown, as indicated by the terminal illustrated while the emitter electrode thereof is connected through the resistor means $R_{10}$ to the circuit reference potential and to the input of the low-pass filter means indicated by the dashed block 5.

The low-pass filter means 5 is illustrated in FIG. 5 as comprising an RC circuit formed by the resistor means $R_3$ and the capacitor means $C_3$. The resistor means $R_3$ and the capacitor means $C_3$ are connected in the same low-pass filter configuration shown in FIG. 2 and act in the manner explained above to pass all signal components of the pulse train applied thereto whose frequency resides below the cutoff frequency thereof while signal components of such pulse train which exceed said cutoff frequency are sharply attenuated. The output of the low-pass filter means 5 is applied to the base electrode of the transistor means $TR_2$ present in the adder means 2 through the conductor C. Accordingly, it will be appreciated that the adder circuit means 2 receives a first input at the base electrode of the transistor means $TR_1$ from the input terminal means B' and a second input at the base electrode of the transistor means $TR_2$ from the conductor C.

In the operation of the DC restorer apparatus shown in FIG. 5, it will be appreciated that a pulse train having a waveform similar to that indicated in FIG. 3B is applied to the input terminal means B'. This pulse train, as discussed above, is derived by passing a pulse train similar to that shown in FIG. 3A through a high-pass filter to remove the DC components therein and suppress the low frequency components thereof prior to transmission and thereafter transmitting the resulting pulse train, having the waveform illustrated in FIG. 3B, to the receiver portion of the facsimile or data transmission system in which the DC restorer apparatus depicted in FIG. 5 resides. The input signal thus received at the input terminal means B' is applied to the first input of the adder means 2 connected to the base of the first transistor means $TR_1$ and combined thereat with input signals applied to the second input of the adder means 2 through the conductor C to the base of the second transistor means $TR_2$. As shall be seen hereinafter, the input signals applied to the second input of the adder means 2 take the waveform of the pulse train shown in FIG. 3C but are out of phase therewith by 180°. Thus, the output of the differential circuit means formed by the transistors $TR_1$ and $TR_2$ present in the adder means 2, as derived from the collector of the first transistor means $TR_1$, is, in the well-known manner, equal to the input signal applied to the base of the first transistor means $TR_1$ minus the inverted input signal applied to the base of the second transistor means $TR_2$, B—(—C), or equal to the sum of the waveforms B and C, as shown in FIGS. 3B and 3C, respectively. The output of the adder means 2, which takes the composite form of the sum of the waveforms illustrated in FIGS. 3B and 3C, is applied to the input of the amplifier means 3 at the base of the transistor means $TR_3$ therein which forms the first amplifying stage thereof. The transistor means $TR_3$ acts, as aforesaid, to suitably amplify the input signals applied to the base electrode thereof to an appropriate level and to further apply such amplified signals as are present at the collector electrode thereof to the base of the transistor means $TR_4$ present in the second stage of said amplifier means 2. As the second stage of the amplifier means 2 comprises a power output stage formed by the transistors $TR_4$ and $TR_5$, the output of the transistor means $TR_3$ receives additional gain and is applied to the output of the amplifier means 3 which is derived from the common connection between the emitter electrode of the transistor means $TR_4$ and the collector electrode of the transistor means $TR_5$. The resultant output of the adder means 2, in the form of the rectangular pulse train shown in FIG. 3A, as formed by the summation of the waveforms shown in FIGS. 3B and 3C, is thus appropriately amplified and applied to the output terminal means A' of the illustrated DC restorer apparatus. Additionally, the output of the amplifier means 2 is applied to the input of the flip-flop circuit means 4 and more particularly to the base electrode of the transistor means $TR_6$ present therein. As stated previously, the transistor means TR 6 is connected in the well-known configuration of a polarity discriminator so that when a negative pulse is applied to the base electrode thereof, a positive pulse is produced at the collector electrode thereof while a negative pulse is produced at the emitter electrode and conversely, when a positive pulse is applied to the base electrode of transistor means $TR_6$ a negative pulse is produced at the collector electrode and a positive pulse is produced at the emitter electrode thereof. Thus, each leading edge of each pulse present in the pulse train output of the amplifier means 3 applied to the base of transistor means $TR_6$ will cause the generation of a positive pulse at the emitter electrode thereof and a negative pulse at the collector electrode thereof while each lagging edge of each pulse therein will cause a positive pulse to be applied to the collector electrode of transistor means $TR_6$ and a negative pulse to be applied to the emitter electrode thereof. The output pulses present at the collector electrode of the transistor means $TR_6$ are applied through the conductor *a* to the differentiator circuit formed by the capacitor means $C_5$ and the resistor means $R_8$ where such pulses are formed into sharply defined trigger pulses and further applied to the junction intermediate the diode means $D_1$ and $D_2$. The diode means $D_1$ and $D_2$ then act in the well-known manner to apply properly directed positive trigger pulses to the base electrode of the transistor means $TR_7$ while negative pulses applied to the junction therebetween are passed through the diode means $D_2$ to the circuit reference potential. Accordingly, it will be seen that each time the lagging edge of a pulse from the output of the amplifier means 3 is applied to the base of the transistor means $TR_6$, a positive trigger pulse will be applied to the base electrode of the transistor means $TR_7$. Similarly output pulses present at the emitter electrode of the transistor means $TR_6$ are applied through the conductor *b* to the differentiator circuit formed by the capacitor means $C_6$ and the resistor means $R_9$ whereby such pulses are shaped into trigger pulses and further applied to the junction intermediate the diode means $D_3$ and $D_4$. The diode means $D_3$ and $D_4$ then act in the well-known manner to apply properly directed, positive trigger pulses to the base electrode of the transistor means $TR_8$ while negative pulses are applied through the diode means $D_4$ to the circuit reference potential. Thus, in the case of the transistor means $TR_8$, each time a leasing edge of a pulse from the output of the amplifier means 3 is applied to the base of the transistor means $TR_6$, a positive trigger pulse will be applied to the base electrode of the transistor means $TR_8$.

As the transistor means $TR_7$ and $TR_8$ are connected in a separately triggered, bistable multivibrator configuration, as aforesaid, it will be appreciated that each time a positive pulse is received at the base electrode of one of the transistor means $TR_7$ or $TR_8$, the transistor means in receipt of such positive triggering pulse will be driven into the on or conducting state whereby the collector electrode thereof will have a decreasing potential thereon, the other of such transistor means will be driven toward cutoff or the off state and the collector electrode of such other transistor means will manifest maximum collector potential. Accordingly, as the transistor means $TR_8$ is triggered on each time a leading edge of a pulse from the output of the amplifier means 3 is applied to the base of the transistor means $TR_6$ and the transistor means $TR_7$ is triggered on each time a lagging edge of a pulse from the output of the amplifier means 3 is applied to the base of the transistor means $TR_6$, it will be seen that a rectangular pulse train is generated at the collector electrode of the transistor means $TR_7$ which is representative of the output of the amplifier means 3 while a rectangular pulse train is generated at the collector electrode of the transistor means $TR_8$ which is representative of, but 180° out of phase with the output of the amplifier means 3. Therefore, as the output of bistable multivibrator formed by the transistor means $TR_7$ and $TR_8$ is taken from the collector electrode of the transistor means $TR_8$, seen that the output of the multivibrator circuit formed by transistors $TR_7$ and $TR_8$ it will be seen that the output of the multivibrator circuit formed by transistors $TR_7$ and $TR_8$ is representative of, but 180° out of phase with the output of the amplifier means 3. The output of the bistable multivibrator means, as taken from the collector electrodes of the transistor means $TR_8$, is applied to the base of the transistor means $TR_9$. The transistor means $TR_9$ is connected in an emitter-follower configuration, as stated above, whose high input impedance and low output impedance is here utilized to match the impedance of the flip-flop circuit means 4 to the low-pass filter means 5 connected thereto. Therefore, the transistor means $TR_9$, which exhibits a gain somewhat less than unity, acts in the conventional manner to apply the inverted pulse train output present at the collector electrode of the transistor means $TR_8$ to the input of the low-pass filter means 5.

The low-pass filter means 5, as stated above is a simple RC circuit formed by the resistor means $R_3$ and the capacitor means $C_3$ and acts in the well-known manner to substantially attenuate frequency components received thereby which reside above the cutoff frequency thereof while frequency components residing below such cutoff frequency are passed thereby. Accordingly, the components of the rectangular pulse train produced by the flip-flop circuit means 4 which reside above the cutoff frequency of the low-pass filter means are substantially attenuated while all such components which reside below such cutoff frequency are passed by said low-pass filter means 5 and applied to the conductor C. Thus, as the output of the flip-flop circuit means 4 is representative of the output of the amplifier means 3 but 180° out of phase therewith, the output of the low-pass filter means 5 will take the form of a pulse train whose waveform is 180° out of phase with the waveform shown in FIG. 3C. Therefore, as the conductor C is connected to the base electrode of the second transistor means $TR_2$ and serves as the second input to the adder means 2, it will be appreciated that the differential circuit formed by the first and second transistor means $TR_1$ and $TR_2$ present in the adder means 2 receives at the first input thereto a first input signal B, and a second input signal (—C), representative of the inverted DC and low frequency components of a rectangular pulse train corresponding to the pulse train initially sought to be transmitted. Accordingly, the B—(—C) output of the adder means 2 and after amplification, the output of the DC restorer apparatus according to the present invention, is representative of the original signal sought to be transmitted as indicated by the waveform shown in FIG. 3A. Furthermore, it will be appreciated from the preceding description of FIG. 5, that in addition to the advantages of the use of the flip-flop circuit means previously set forth; the manner in which the flip-flop circuit means shown in FIG. 5 is driven alternately with positive and negative pulses applied to the transistor means $TR_6$ renders the flip-flop circuit highly insensitive to noise because the probability of said flip-flop circuit means being erroneously switched by noise is extremely low and if such erroneous switching should occur, normal operation will be quickly restored.

Although the present invention has been disclosed in conjunction with a specifically described exemplary embodiment, it will be obvious to those of ordinary skill in the art that many modifications and variations thereof are available which in no way change the basic concepts of the present invention. For instance, the specific transistor circuits illustrated in FIG. 5 may be replaced in part or in their entirety with other circuits which may utilize tube or transistor devices of any type, active or passive low-pass filter means may be relied upon in place of the simple RC circuit shown and any form of bistable switching circuit may be inserted in the feedback loop established.

While the present invention has been described in connection with an exemplary embodiment thereof, it will be understood that many modificatons will be readily apparent to those of ordinary skill in the art; and that this application is intended to cover any adaptations or variations thereof.

I claim:

1. DC restorer apparatus comprising:

input terminal means adapted to receive an input signal to be subjected to DC restoration;

output terminal means adapted to receive a DC restored output signal;

adder means for receiving first and second inputs and producing in response thereto a resultant output signal representative of the sum of such first and second inputs, said adder means being connected at a first input thereto to said input terminal means;

bistable circuit means capable of assuming first and second states and producing an output signal representative of the state thereof;

means for applying said resultant output signal of said adder means to said output terminal means and to said bistable circuit means as an input thereto; and low-pass filter means for passing signal components whose frequency resides below a select cutoff frequency and attenuating signal components whose frequency resides above said cutoff frequency, said low-pass filter means being connected at an input thereto to said bistable circuit means and at an output thereof to said second input of said adder means.

2. The DC restorer apparatus according to claim 1 wherein said bistable circuit means comprises flip-flop circuit means.

3. The DC restorer apparatus according to claim 2 wherein said means for applying said resultant output signal of said adder means to said output terminal means and to said bistable circuit means includes amplifier means for applying a suitable gain to said resultant output signal.

4. The DC restorer apparatus according to claim 3 additionally comprising polarity discriminator means for receiving said resultant output signal from said adder means and controlling the state of said flip-flop circuit means in response thereto, said polarity discriminator means being electrically interposed between said means for applying said resultant output signal of said adder means to said bistable circuit means as an input thereto and said input thereto.

5. The DC restorer apparatus according to claim 4 wherein said flip-flop circuit means comprises bistable multivibrator means.

6. The DC restorer apparatus according to claim 5 wherein said bistable multivibrator means includes at least two switch means, each of said switch means including individual input means for controlling the state thereof.

7. The DC restorer apparatus according to claim 6 wherein said polarity discriminator means includes first and second outputs indicative of the polarity of said resultant output signal received thereby, said first output of said polarity discriminator means being connected to said input means of one of said switch means and said second output of said polarity discriminator means being connected to said input means of the other of said switch means.

8. The DC restorer apparatus according to claim 7 wherein said bistable multivibrator means produces an output signal corresponding to said resultant output signal produced by said adder means but out of phase therewith by 180°.

9. The DC restorer apparatus according to claim 8 wherein said adder means comprises differential circuit means.